(12) United States Patent
Goddard (10) Patent No.: US 11,647,697 B2
(45) Date of Patent: May 16, 2023

(54) REAR MOUNT BALE SPREADER

(71) Applicant: Bruce Goddard, Charles City, IA (US)

(72) Inventor: Bruce Goddard, Charles City, IA (US)

(*) Notice: Subject to any disclaimer, the term of this patent is extended or adjusted under 35 U.S.C. 154(b) by 140 days.

(21) Appl. No.: 15/968,343

(22) Filed: May 1, 2018

(65) Prior Publication Data

US 2018/0310484 A1 Nov. 1, 2018

Related U.S. Application Data

(60) Provisional application No. 62/492,550, filed on May 1, 2017.

(51) Int. Cl.
| | |
|---|---|
| *A01F 29/00* | (2006.01) |
| *A01F 29/06* | (2006.01) |
| *A01F 29/01* | (2006.01) |
| *A01F 29/14* | (2006.01) |
| *A01F 29/12* | (2006.01) |
| *A01F 29/10* | (2006.01) |

(52) U.S. Cl.
CPC ............ *A01F 29/005* (2013.01); *A01F 29/01* (2013.01); *A01F 29/06* (2013.01); *A01F 29/10* (2013.01); *A01F 29/12* (2013.01); *A01F 29/14* (2013.01)

(58) Field of Classification Search
CPC .......... A01F 29/01; A01F 29/06; A01F 29/10; A01F 29/12; A01F 29/14
USPC .................................................. 241/111.762
See application file for complete search history.

(56) References Cited

U.S. PATENT DOCUMENTS

| | | | | |
|---|---|---|---|---|
| 3,815,823 | A | | 6/1974 | Johnson |
| 3,926,378 | A | * | 12/1975 | Ryan ...................... A01F 29/00 241/154 |
| 4,037,799 | A | * | 7/1977 | Urban ..................... B02C 13/04 241/186.5 |
| 4,053,071 | A | | 10/1977 | Schrag et al. |
| 4,227,654 | A | * | 10/1980 | Seefeld ................. A01F 29/005 241/34 |
| 4,449,672 | A | * | 5/1984 | Morlock ............... A01D 87/127 241/101.76 |
| 4,524,916 | A | * | 6/1985 | Keyes .................. A01D 87/127 241/101.76 |
| 4,779,810 | A | * | 10/1988 | Frey ...................... A01F 29/005 241/101.76 |
| 4,830,292 | A | | 5/1989 | Frey |
| 4,934,615 | A | * | 6/1990 | Osborne ............... A01F 29/005 241/186.4 |
| 5,090,630 | A | * | 2/1992 | Kopecky .............. A01D 87/127 241/101.76 |
| 5,195,402 | A | * | 3/1993 | McMillen ............ A01F 15/085 100/88 |
| 5,368,238 | A | * | 11/1994 | Bergkamp ........... A01F 29/005 241/223 |
| 5,573,190 | A | | 11/1996 | Goossen |
| 5,601,241 | A | | 2/1997 | Brewster |

(Continued)

*Primary Examiner* — Shelley M Self
*Assistant Examiner* — Smith Oberto Bapthelus
(74) *Attorney, Agent, or Firm* — BrownWinick Law Firm; David Breiner (57) ABSTRACT

A three-point bale spreader attachable to a tractor includes an arm capable of lifting a bale into a processing chamber. A pair of rotors with a plurality of flail knives is rotated to shred the bale. A conveyor feeds the bale into the rotating rotors, while a door can be opened to varying degrees to allow the shredded material to exit the bale spreader.

21 Claims, 8 Drawing Sheets

(56) References Cited

U.S. PATENT DOCUMENTS

| | | | | |
|---|---|---|---|---|
| 5,622,323 A * | 4/1997 | Krueger | B01F 13/1041 | 241/101.76 |
| 5,967,427 A * | 10/1999 | Seymour | A01C 3/063 | 239/676 |
| 5,975,444 A * | 11/1999 | Ethier | A01F 29/005 | 241/101.76 |
| 6,109,553 A * | 8/2000 | Hruska | A01F 29/005 | 241/189.1 |
| 6,199,781 B1 * | 3/2001 | Hruska | A01F 29/005 | 241/101.763 |
| 6,202,950 B1 * | 3/2001 | Hruska | A01F 29/005 | 241/101.762 |
| 7,509,785 B2 * | 3/2009 | Fukumori | A01F 15/07 | 53/118 |
| 7,546,966 B2 * | 6/2009 | Lepage | A01K 5/002 | 241/285.2 |
| 7,871,029 B2 | 1/2011 | Frey | | |
| 7,967,231 B2 * | 6/2011 | Post | A01F 29/005 | 241/277 |
| 8,991,490 B2 * | 3/2015 | Langenfeld | E21B 17/03 | 166/242.6 |
| 9,521,809 B2 * | 12/2016 | Stam | A01F 29/10 | |
| 9,769,987 B2 * | 9/2017 | Egging | A01D 87/0007 | |
| 9,802,201 B2 * | 10/2017 | Stam | B02C 13/28 | |
| 10,022,723 B2 * | 7/2018 | Graham | B02C 13/04 | |
| 2003/0075629 A1 | 4/2003 | Lucas et al. | | |
| 2003/0093979 A1 * | 5/2003 | Fukumori | A01F 15/07 | 53/587 |
| 2006/0175445 A1 | 8/2006 | Hoovestol | | |
| 2007/0138328 A1 * | 6/2007 | Hoovestol | A01F 29/005 | 241/189.1 |
| 2011/0220748 A1 * | 9/2011 | Bennett | A01F 29/005 | 241/30 |
| 2014/0326817 A1 * | 11/2014 | Wentz | A01F 29/005 | 241/101.76 |
| 2015/0090817 A1 * | 4/2015 | Stam | A01F 29/10 | 241/28 |
| 2015/0102146 A1 * | 4/2015 | Neudorf | A01F 29/12 | 241/101.5 |
| 2016/0050848 A1 * | 2/2016 | Goddard | B02C 13/02 | 241/186.35 |
| 2017/0055457 A1 * | 3/2017 | Stam | A01F 29/005 | |

* cited by examiner

REAR MOUNT BALE SPREADER

CROSS-REFERENCE TO RELATED APPLICATIONS

The present application claims priority to provisional patent application 62/492,550 which was filed on May 1, 2017, and is hereby expressly incorporated by reference in its entirety.

BACKGROUND OF THE INVENTION

This invention pertains to spreading preformed bales for bedding and livestock feeding. In the farming industry, bales of cut and raked crop are utilized for a variety of purposes, and their shape allows for ease in transport and handling. In some applications, the bale is to be torn apart and used for bedding and or feed for animals.

Tractors can be utilized for transporting bales around a farm, and are common place in farming operations. Tractors can run attachments through a power takeoff (PTO) which can utilize an output shaft on the tractor that can be connected to a corresponding shaft on the attachment.

In regard to processing bales, the prior art utilizes a loader to transport and power a bale spreader in use around a farming operation. The setup can lead to the loader becoming top heavy or in some other way out of balance. Such imbalance can lead to the loader turning over and causing damage to the loader, bale spreader and the user of the devices. Furthermore, in the prior art, the bale itself must be loaded in the bale spreader. Typically, the loading is done by another device or by use of manual labor.

It is therefore an object of the invention to provide a bale spreader that can pick up a bale.

It is further an object of the invention to provide a bale spreader that can be powered by a typical farm tractor.

SUMMARY OF THE INVENTION

The present invention is a device that can be selectively attached to a typical farm tractor. Specifically, the device is a bale spreader, attachable to a farm implement such as a tractor, that can be run by a PTO of the tractor. The bale spreader utilizes a movable arm that can secure a bale and then lift the bale into a compartment of the bale spreader. A conveyor in the bale spreader compartment feeds the bale toward a series of rotors. The rotors include a plurality of knives that shred the bale when the rotors are rotating. The shredded components of the bale exit out a door of the bale spreader to a location where the shredded components are needed. The components of the bale spreader can be powered by the tractor and a hydraulic system, therefore, no other power sources are required to run the bale spreader.

DETAILED DESCRIPTION OF THE INVENTION

Now referring to the figures, a bale spreader 20 that is attached to the rear of a typical farm tractor 21 is detailed. Preferably the bale spreader 20 has mounting members 26 that can be selectively attached to a three point hitch 27 of a typical farm tractor 21. The bale spreader 20 has a linkage member 22 that is attachable to a rear power take-off (PTO) 47 of the tractor 21.

Figure 1:
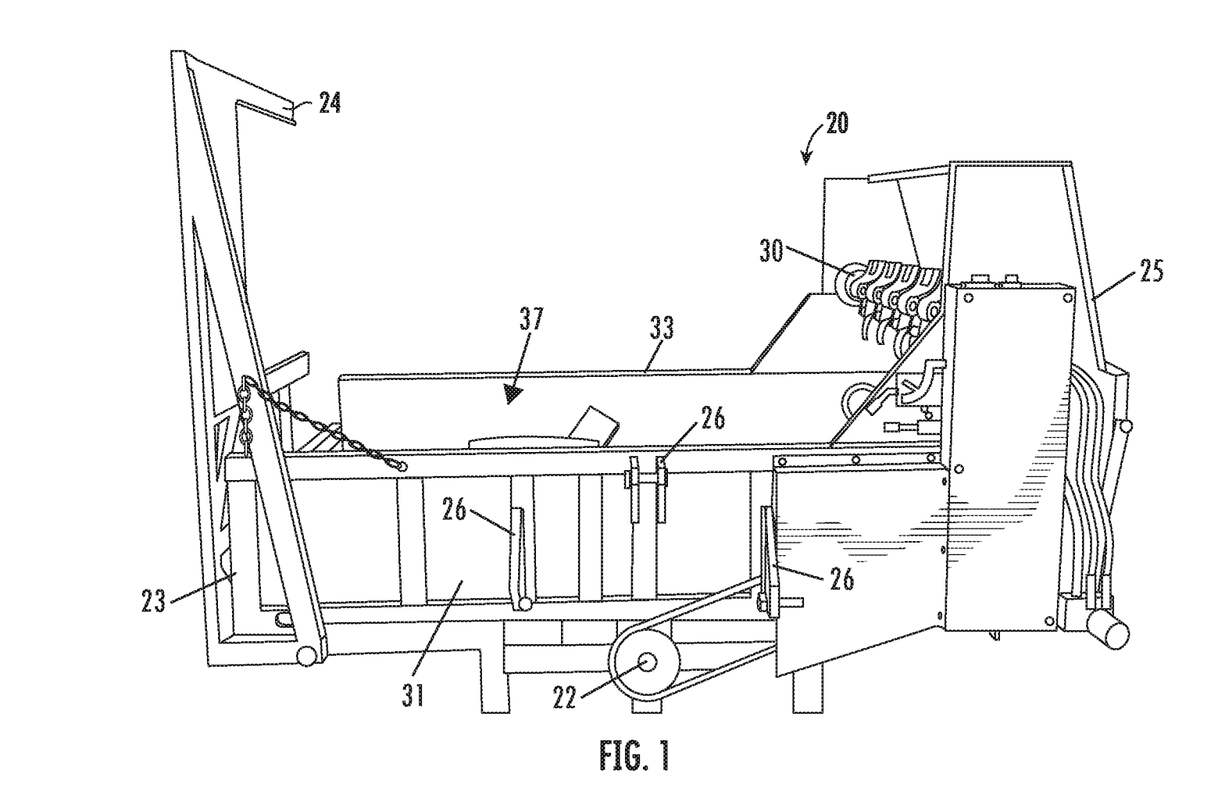
FIG. 1 is a perspective view of a bale spreader.

As shown in FIG. 1, the bale spreader 20 comprises a first side 23, a second side 25, a front 31, and a back 33. The bale spreader 20 further comprises a floor 35. The space between the first side 23, the second side 25, the front 31 and the back 33 and above the floor 35 defines a processing chamber 37.

Figure 2:
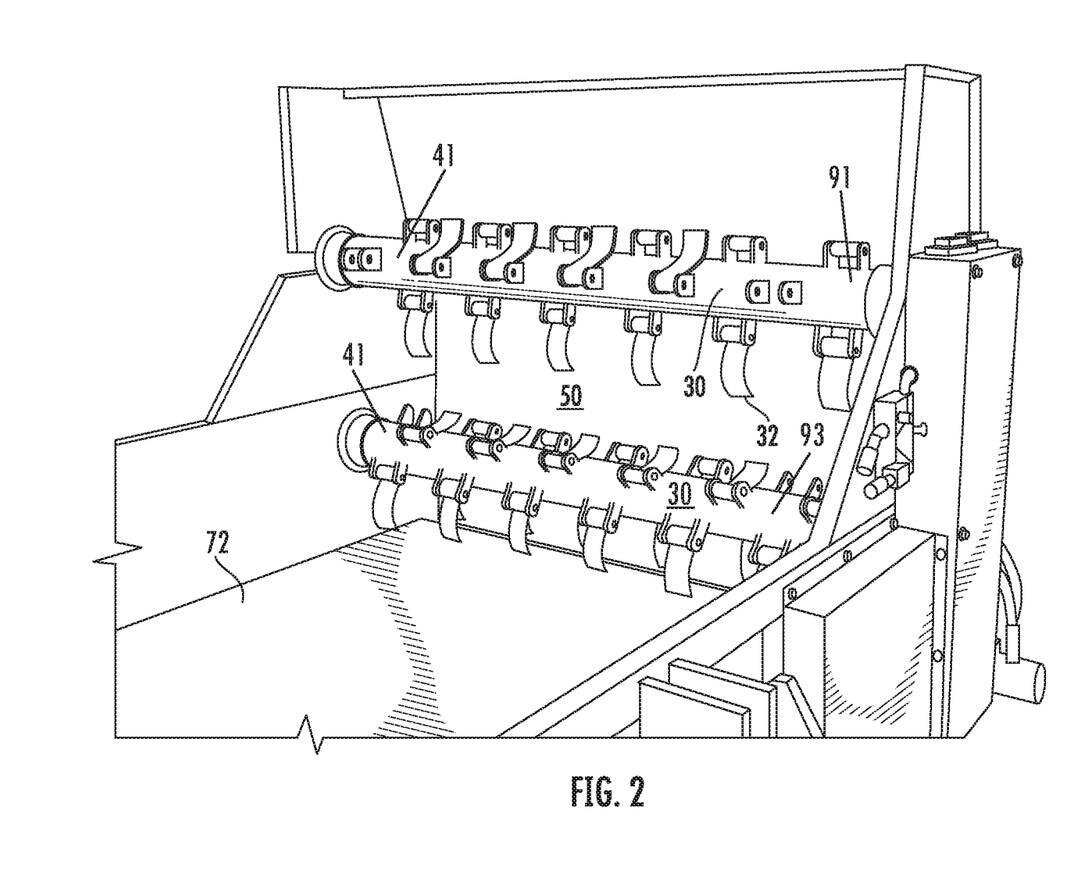
FIG. 2 is a perspective view of the rotors and bed of the bale spreader.
Figure 3:
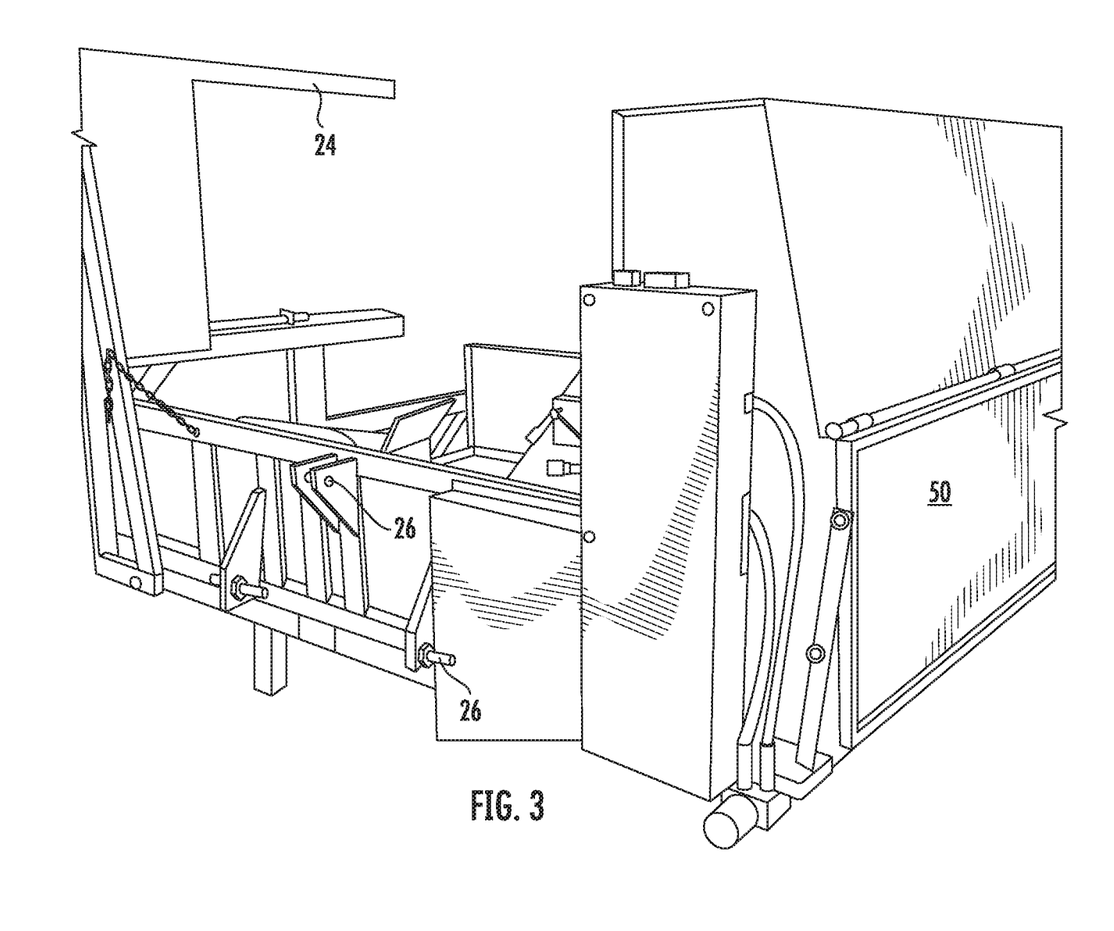
FIG. 3 is a front perspective view of the bale spreader showing the deflector in a closed position.
Figure 4:
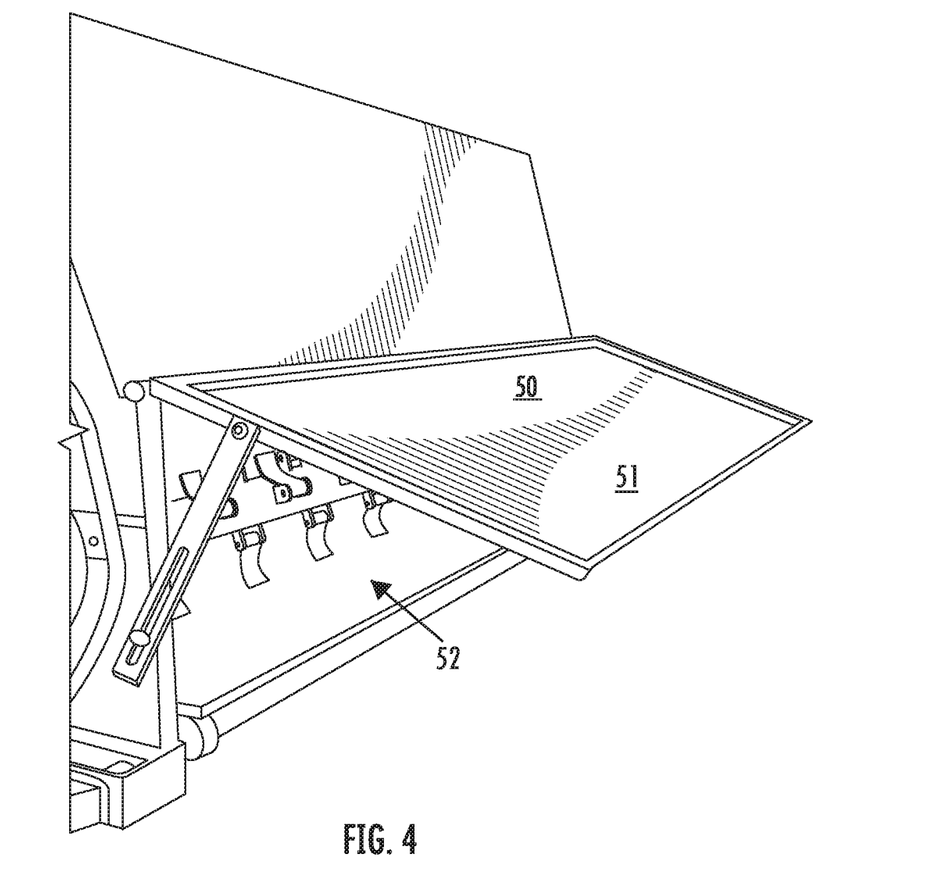
FIG. 4 is a perspective view of the deflector in an opened position.

As best seen in FIG. 2, the bale spreader 20 has a plurality of rotors 30 that span from the front 31 to the back 33. The rotors 30 are horizontal and substantially parallel to one another and located on or near the second side 25. The rotors 30 include knives 32 that are attached to a main body 41 of the rotors 30. The rotors 30 are rotatable in a first direction. As the knives 32 are attached to the main bodies 41 of the rotors 30, the knives 32 are also rotated during operation. As shown in FIGS. 3 and 4, preferably on the second side 25, a door 50 serves as a deflector 51 that can selectively cover an opening 52.

Figure 5:
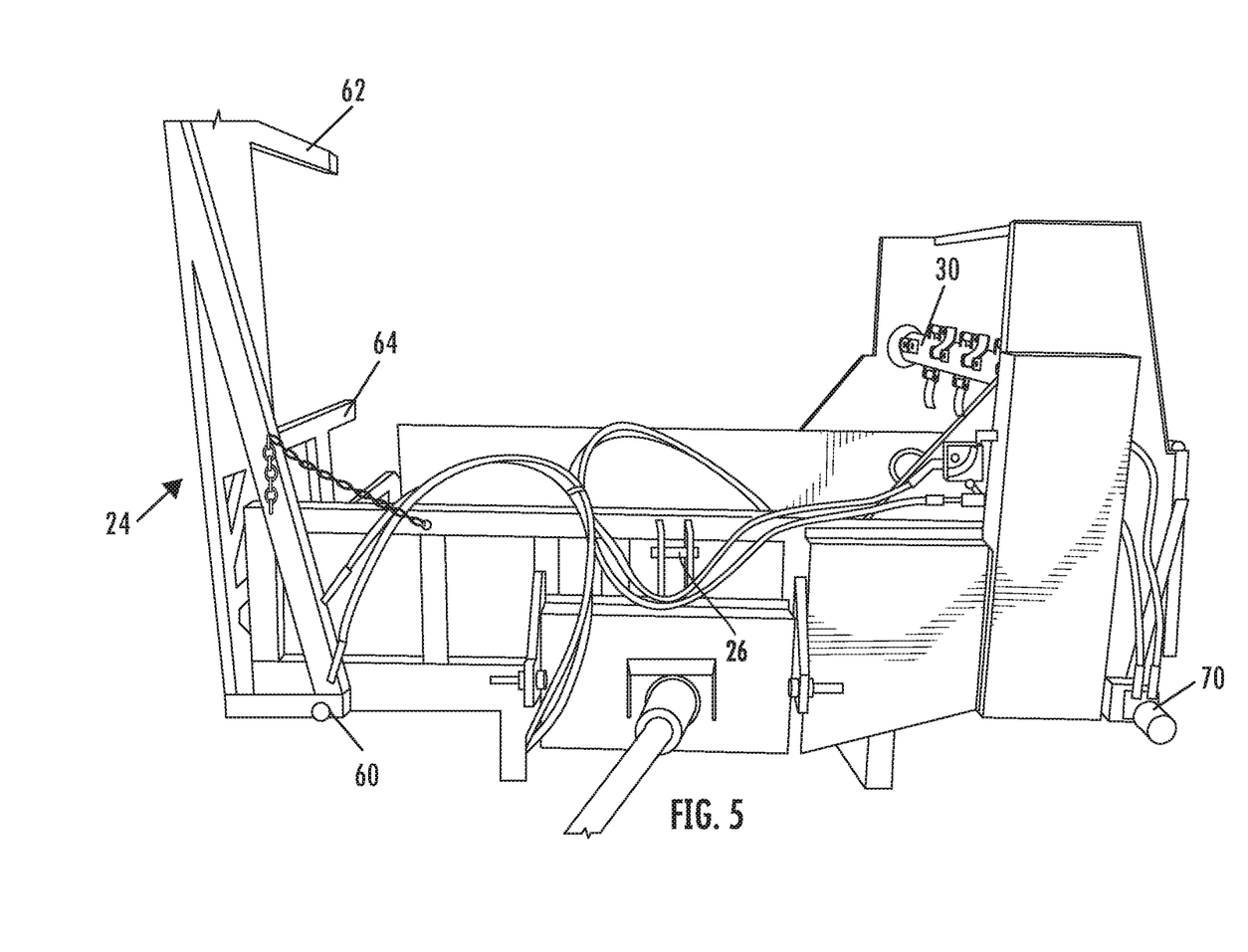
FIG. 5 is a front perspective view of the bale spreader showing certain hydraulic connections.
Figure 7:
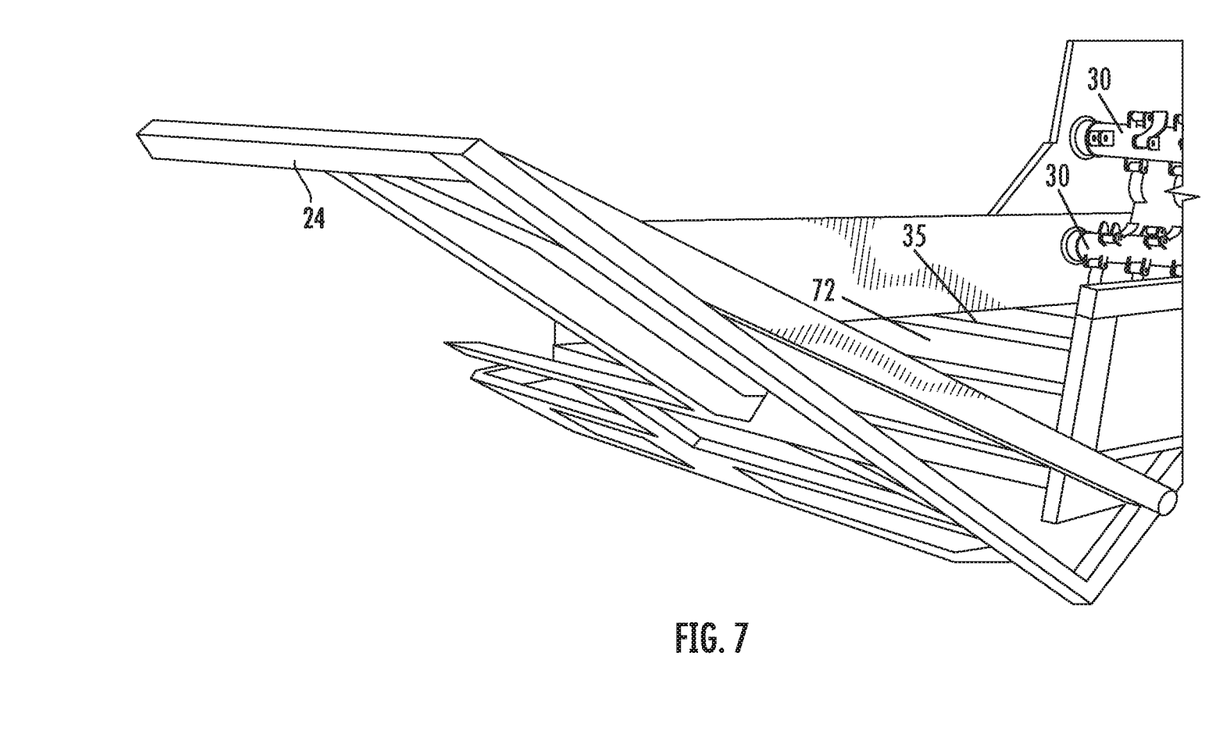
FIG. 7 is a perspective view of the arm of the bale spreader in a partially downward position.

As best shown in FIGS. 5 and 7, the first side 23 includes an arm 24 that is pivotally attached to the front 31 and back 33 of the bale spreader 20 at pivot points 60. The arm 24 comprises a first bale support member 62 and preferably a second bale support member 64. The first and second bale support members 62, 64 are horizontal and substantially parallel to one another. The spacing between the first bale support member 62 and the second bale support member 64 is sufficient such that a bale will not fall through said space which is preferably about four feet. The arm 24 can move from a first position to a second position. The first position has the arm 24 substantially perpendicular to the ground, while the second position has the arm 24 substantially parallel to the ground. The arm 24 is also positionable in any position between the first position and the second position. The arm 24 is movable via a hydraulic system including a motor 70 which is preferably a hydraulic motor.

Figure 6:
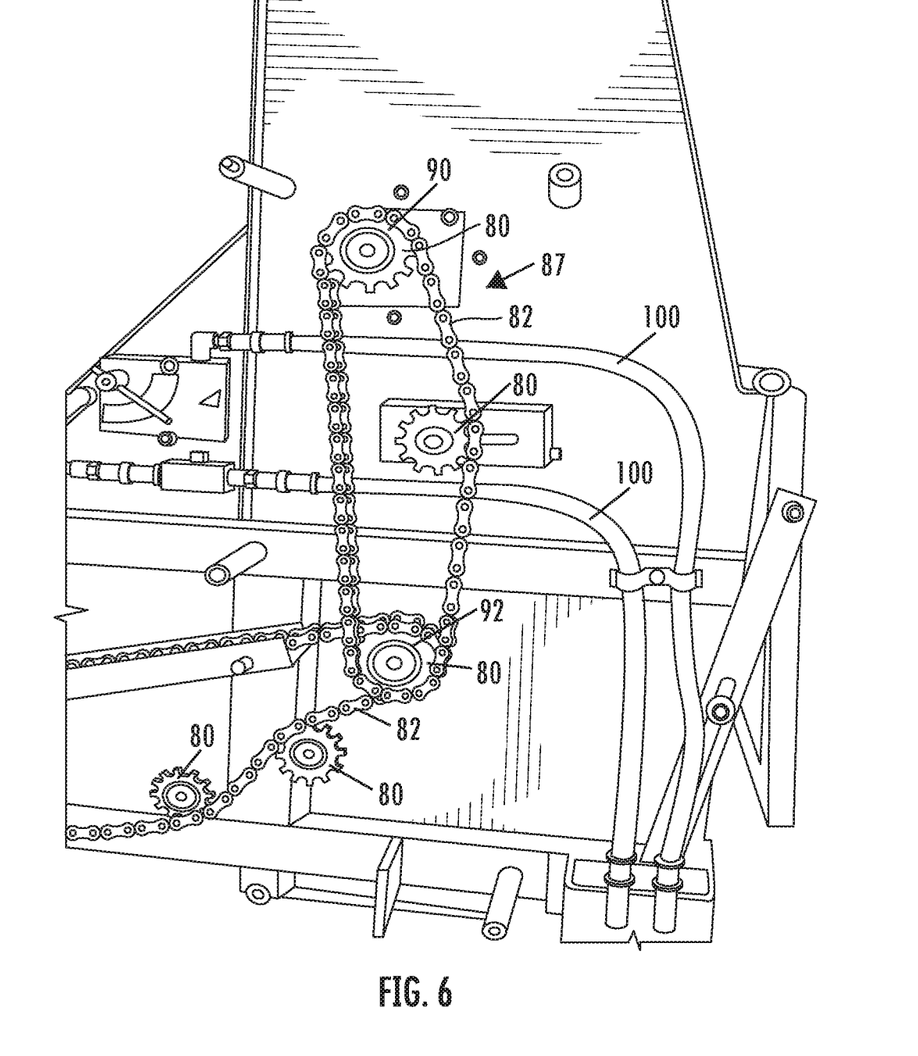
FIG. 6 is front view of the chain and sprockets that assist in moving the conveyor and rotors.
Figure 8:
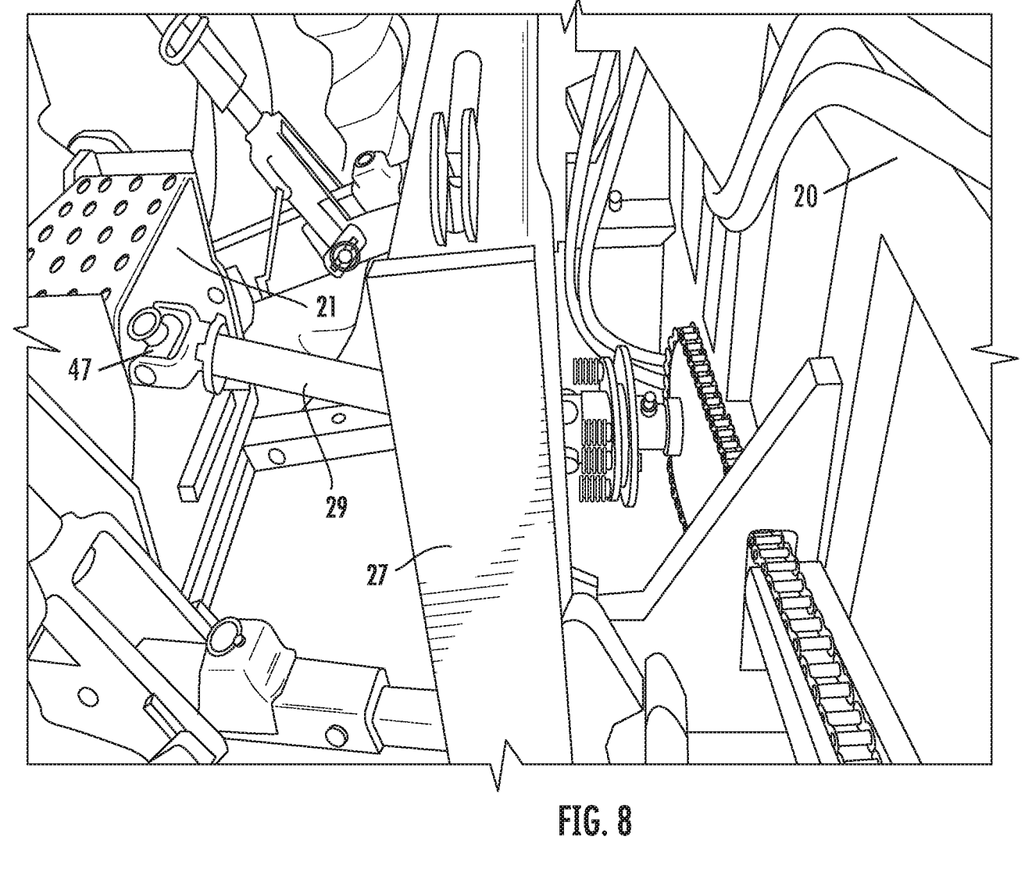
FIG. 8 is a perspective view of the connection between a tractor and the bale spreader.

The floor 35 has a movable conveyor 72 that is drivable via the PTO of the tractor or other outside power. The conveyor 72 moves toward the second side 25 and rotors 30. As best seen in FIGS. 6 and 8, a series of sprockets 80 and chains 82 are part of a drive system 87 that power the rotors 30 and the conveyor 72. The sprocket 90 and sprocket 92 are mechanically connected to the upper rotor 91 and lower rotor 93 respectively. The hydraulic tubing 100 is connected from the motor 70 to the arm 24 and assist in moving the arm 24 via the hydraulic system.

In operation, the bale spreader 20 is connected to a power source that will drive the sprocket and chain mechanism. Typically this is the PTO of a tractor as shown in FIG. 8. A shaft 29 extending from the PTO 47 is connected to the linkage member 22 of the bale spreader 20. Additionally, the three point hitch 27 is secured in the mounting members 26. The PTO 47 is switched on which rotates a sprocket 80 which drives the entire set of attached chains 82 and additional sprockets 80, 90 and 92, thereby rotating the rotors 30 and conveyor 72.

Next, the arm 24 is lowered to the second position via the hydraulic system and motor 70 and a bale is placed on and between the first bale support member 62 and the second bale support member 64. The hydraulic system and motor 70 is activated to bring the arm 24 to the upright first position. During the movement of the arm 24 from the second position to the first position, the bale will drop on to the conveyor 72 via gravity. The movement of the conveyor 72 moves the bale toward the rotors 30. The knives of the rotors 30 chop up the bale and the processed material is pushed out the opening 52 and past the door 50. As best shown in FIGS. 3 and 4, the door 50 can be set to a particular position to deflect the processed material in a desired direction.

The speed of the conveyor 72 can be adjusted by the power given via the PTO 47 and determines the speed the bale is moved toward the rotors 30. Additionally, the speed of the conveyor 72 and the rotational speed of the rotors 30 affect the length of the cut of the bale and how much is extracted through the rotors 30.

The foregoing description of the invention embodiments has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application in order to enable one skilled in the art to utilize the invention in various embodiments and with various modifications as are suited to the particular use contemplated. It is intended that the scope of the invention be defined by the claims appended hereto, and by their equivalents.

The invention claimed is:

1. A bale spreader for shredding a bale, the bale spreader comprising:
  a processing chamber defined by a front, a back opposite the front, a first side, a second side opposite the first side, and a floor;
  mounting members on the front;
  an arm configured to pivot towards the second side;
  at least one rotor between the front and the back;
  a motor operatively connected to the arm to pivot the arm from the first side towards the second side; and
  a conveyor on the floor, the conveyor configured to convey the bale toward the at least one rotor, wherein the at least one rotor has a plurality of knives configured to shred the bale to produce shredded material and the second side has an opening through which the shredded material is discharged.

2. The bale spreader of claim 1, wherein the mounting members are configured to attach to a rear of a tractor.

3. The bale spreader of claim 2, wherein the arm comprises at least one bale support member configured to secure the bale for loading into the bale spreader.

4. The bale spreader of claim 2, wherein the arm comprises a first bale support member and a second bale support member configured to secure the bale for loading into the bale spreader.

5. The bale spreader of claim 4, wherein:
  the first bale support member is horizontal;
  the second bale support member is horizontal;
  the first bale support member is substantially parallel to the second bale support member.

6. The bale spreader of claim 1, further comprising:
  a deflector at least partially covering the opening in the second side.

7. The bale spreader of claim 6, wherein:
  the deflector is movable from a closed position to an open position.

8. The bale spreader of claim 7, wherein the deflector is selectively angled to deflect the shredded material.

9. The bale spreader of claim 1, further comprising:
  a linkage on the front, wherein the linkage is configured to attach to a power take-off of a tractor and wherein the linkage is operatively connected to a sprocket and chain mechanism configured to actuate the conveyor of the bale spreader.

10. A bale spreader for shredding a bale, the bale spreader comprising:
  a first side, a floor, a front, a back, and a second side opposite of the first side;
  an arm having pivot points on the front and the back so the arm can pivot from the first side towards the second side;
  a conveyor on the floor, the conveyor configured to move the bale from the first side toward the second side, said second side associated with a plurality of rotors;
  a sprocket and chain mechanism configured to actuate the conveyor;
  a linkage member on the front, the linkage member configured to connect to a power take-off and power the sprocket and chain mechanism;
  the plurality of rotors each having a plurality of knives;
  the plurality of rotors spanning from the front to the back and near a discharge opening on the second side;
  wherein the plurality of knives are rotated and shred the bale into shredded material and the shredded material is discharged out of the opening on the second side.

11. The bale spreader of claim 10, wherein the arm is movable from a first position to a second position;
  the arm is configured to slide under the bale in the second position;
  the arm is configured to be raised to the first position by a motor;
  the arm moves the bale.

12. The bale spreader of claim 11, wherein:
  the arm comprises at least one bale support member;
  wherein the at least one bale support member is configured to secure the bale for loading into the bale spreader.

13. The bale spreader of claim 11, wherein:
  the arm comprises a first bale support member and a second bale support member;
  wherein together the first bale support member and the second bale support member are configured to secure the bale for loading into the bale spreader.

14. The bale spreader of claim 13, wherein:
  the first bale support member is horizontal;
  the second bale support member is horizontal;
  the first bale support member is substantially parallel to the second bale support member.

15. The bale spreader of claim 14, further comprising:
  a deflector at least partially covering the opening.

16. The bale spreader of claim 15, wherein the deflector is movable from a closed position to an open position.

17. The bale spreader of claim 16, wherein:
  the deflector adjustable to achieve a particular deflection of the shredded material.

18. The bale spreader of claim 17 wherein said motor comprises a hydraulic motor coupled to the arm to actuate movement from the first position to the second position.

19. The bale spreader of claim 10, wherein:
the rotors are rotated by the sprocket and chain mechanism.

20. A bale spreader for shredding a bale, said bale spreader comprising:
- a processing chamber having a front, a back opposite the front, a first side, a second side opposite the first side, a floor and a conveyor on the floor, the conveyor configured to move a bale from the first side to the second side;
- an arm having a pivot axis parallel with a direction of travel of the bale spreader;
- the arm is movable from a first position to a second position;
- the arm is configured to slide under the bale in the second position;
- the arm configured to be raised to the first position thereby depositing the bale on the conveyor;
- the conveyor is configured to move the bale toward a plurality of rotors, said plurality of rotors near the second side;
- the rotors having a plurality of knives;
- the rotors rotatable in a first direction;
- wherein the plurality of knives are rotated with the rotors and shred the bale into shredded material;
- said conveyor conveying the shredded material out an opening at the second side;
- the rotors and the conveyor of the bale spreader configured to be powered by a power take-off of a tractor, wherein the power take-off couples to a linkage member arranged on the front of the bale spreader.

21. A bale spreader for shredding a bale, the bale spreader comprising:
- a first side, a front, a back, and a second side opposite of the first side;
- an arm configured to pivot from the first side towards the second side;
- a conveyor configured to move the bale from the first side toward the second side, said second side associated with a plurality of rotors;
- the plurality of rotors each having a plurality of knives;
- the plurality of rotors spanning from the front to the back and near a discharge opening on the second side;
- wherein the plurality of knives are rotated and shred the bale into shredded material and the shredded material is discharged out of the opening on the second side; and
- mounting members on the front, the mounting members configured to attach to a three point hitch of a tractor.

* * * * *